United States Patent Office 2,992,577
Patented July 18, 1961

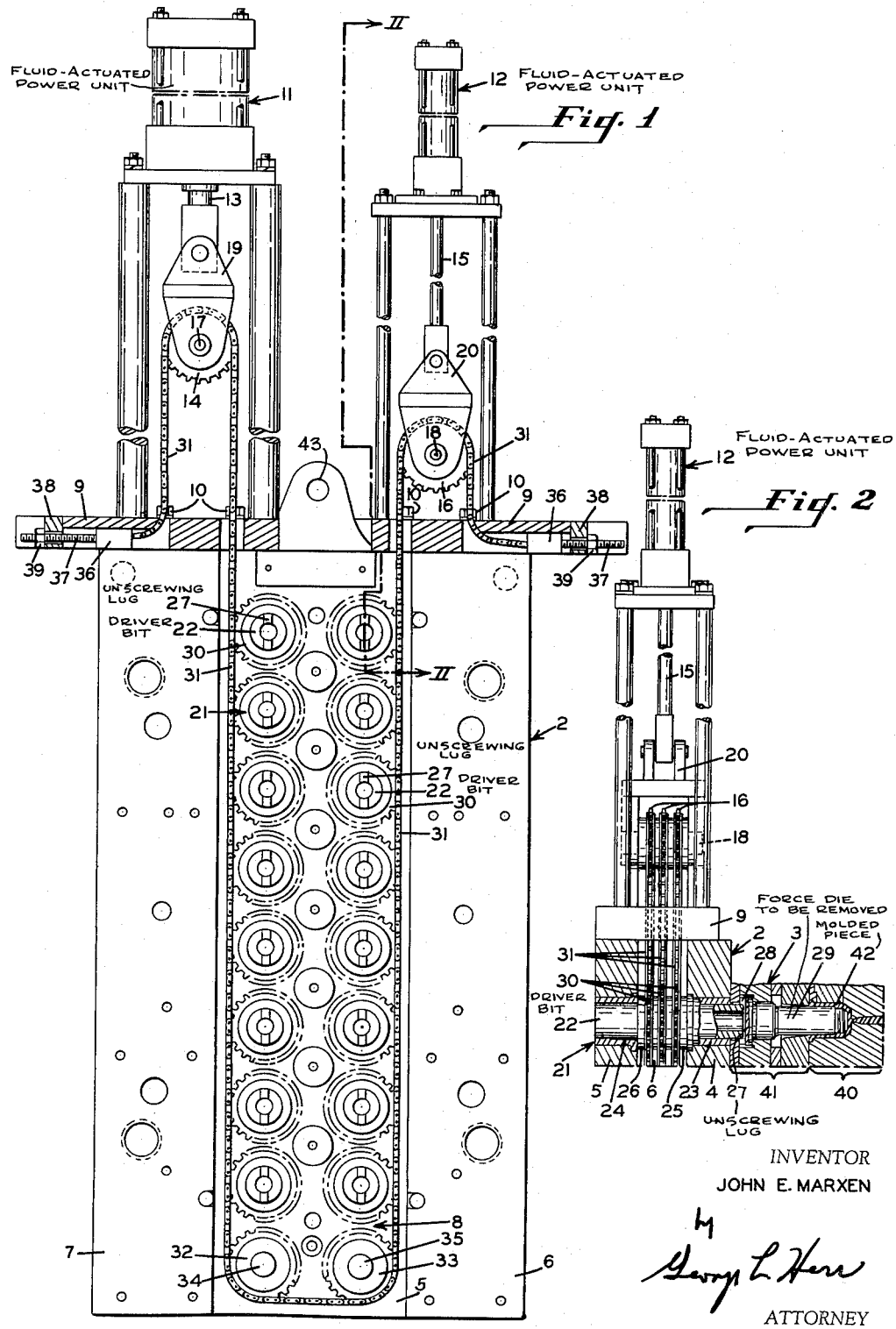

2,992,577
UNSCREWING FIXTURE
John E. Marxen, Lancaster, Pa., assignor to Armstrong Cork Company, Lancaster, Pa., a corporation of Pennsylvania
Filed Sept. 28, 1959, Ser. No. 842,629
4 Claims. (Cl. 81—57)

This invention relates to a power operated device for removing force dies from molded articles for a molding die set. It is concerned more particularly with an unscrewing fixture which may be used with an injection molding die set for the molding of internally screw threaded bottle closures or the like where the force die which forms the interior surface of the article is rotated in the removal of the molded piece from it.

In the fabrication of molded bottle closures, for example, from thermoplastic resin compounds, such as polystyrene and polyethylene compositions and other similar molding compounds, it is customary to form a series of closures simultaneously during each cycle of operation of the molding unit. In an injection molding unit which is typical of the field to which the present invention relates, the die set includes a cavity die assembly which, as the name implies, is formed with a plurality of molding cavities into which the molding composition is injected in a molten or melted condition. The die set also includes a force die assembly which is formed with a plurality of force plugs or dies, one for each die cavity. When the die set is closed, the spaces between the individual force dies and the walls of the cavities in which they are received correspond to the shape of the pieces to be molded with the force dies forming the interior of the molded pieces and the cavity walls forming the exterior of the molded pieces when the molding composition is injected into the molding cavities. In the formation of internally threaded screw-type bottle closures, the force dies each are provided with a screw thread projection which forms a screw thread on the interior of the molded closure.

When the molding cycle has been completed in an injection molding die set, it is necessary to unscrew the molded closures from the individual force dies. This is sometimes done by unscrewing the pieces individually but most injection molding die sets for screw closure manufacture today are provided with unscrewing fixtures which are arranged to rotate a group or all of the force dies simultaneously to unscrew them from the molded pieces as the cavity die set is being moved from a closed position with the force dies received within the die cavities to an open position where the molded pieces are cleared from within the cavities.

An object of the present invention is to provide an improved unscrewing fixture which is simple but positive in operation, easily adjusted, and readily repaired, including a readily replaceable chain and sprocket driving mechanism and conventional hydraulic power units for effecting the driving force.

With some types of molded closures, it is desirable to have the interior thread formation circumferentially fixed with respect to the exterior surface of the closure. This insures that, when the closure is applied to a bottle with a screw thread projection corresponding to the internal screw thread in the closure, the decoration on the closure will always assume the same position with respect to the bottle—for example, with the decoration on the closure in proper alignment with a label on the bottle.

Another object of the invention, therefore, is to provide an unscrewing fixture by which the force dies of a multiple cavity die set may be adjusted in unison with respect to the die cavities with which they mate.

Other objects of the invention will be clear from the following description of an embodiment of the invention which has been illustrated in the attached drawing in which:

FIGURE 1 is a front view of the unscrewing fixture of the invention with its front bearing plate removed and with its top mounting plate shown in section, and FIGURE 2 is a sectional view taken along the line II—II of FIGURE 1 but including the front bearing plate and showing a portion of a conventional die set shown in section.

The unscrewing fixture is formed as a unit 2 (FIGURE 2) for assembly with a generally conventional die set 3 of an injection molding machine.

The unscrewing fixture includes a front bearing plate 4 (FIGURE 2), a rear bearing plate 5, and a pair of separated spacer plates 6 and 7 (FIGURE 1). These members provide a sprocket housing 8. The bearing plates 4 and 5 are secured together through the spacer plates 6 and 7 by suitable fastening devices and guiding pins. They are not shown in FIGURE 1 because the front bearing plate 4 has been removed to expose the sprocket housing and the sprockets disposed in it.

A divided top mounting plate 9 is secured to the top of bearing plates 4 and 5 and spacer plates 6 and 7 by fasteners 10 (FIGURE 1). The mounting plate 9 carries a pair of fluid-actuated power units 11 and 12, in the form of hydraulic cylinder and piston power units in the illustrated embodiment. The piston rod 13 of power unit 11 carries a group of three idler sprockets 14 and the piston rod 15 of power unit 12 carries a similar group of idler sprockets 16. The respective groups of sprockets 14 and 16 are mounted on shafts 17 and 18 carried by yokes 19 and 20 pivoted to piston rods 13 and 15. The number of sprockets used may be varied depending upon the product being molded and the torque forces required to effect unscrewing. A single chain and sprocket arrangement may be used where only a relatively low turning torque is needed.

A rotatable driver is provided for each threaded force plug or die in the die set to effect unscrewing of each force die from the molded piece formed around it. In the embodiment shown in FIGURE 1, there are sixteen drivers 21 for a 16-cavity mold arrangement. Each driver 21, as shown in FIGURE 2, includes a driver bit 22 which in the embodiment illustrated is in the form of a hollow cylinder. The bits 22 are mounted for rotation in bearings 23 and 24 provided in the front and back bearing plates 4 and 5. Each bit 22 is shouldered as indicated at 25 and 26 to position it against axial movement during rotation. The bits 22 also are each provided with a lug 27 (FIGURE 1) which is adapted to be received within a transverse or cross slot 28 (FIGURE 2) milled into the end of each threaded force die member 29 of the die set. As will be seen in FIGURE 2, the bits 22 project beyond the surface of the front bearing plate 4 and are received within openings provided for them in the die set as will be more fully hereinafter described. A group of three sprockets 30 is provided on each bit 22, preferably being cut directly on the bit although they may be formed separately and welded or otherwise secured to the bit.

Rotation of the bits 22 through their sprockets 30 is effected by a plurality of chains 31 which are adjustably fastened to the mounting plate 9 and extend over the sprockets 14 carried by the yoke 19 attached to the power unit 11, then along one row of bits 22 in engagement with their sprockets 30 and then over a pair of idler sprockets 32 and 33 mounted on shafts 34 and 35 which pass through the sprocket housing 8 and are journaled for rotation in a manner similar to the unscrewing driver bits 22. The chains 31 then pass along the opposite row of driver bits 22 in engagement with their sprockets 30 and are trained over the sprockets 16 attached by yoke 20 to piston rod 15 of power unit 12. Each end of each chain 31 is fastened by a coupling 36 to an adjusting screw 37 which passes through an opening in a cross plate 38 secured to mounting plate 9. An adjusting nut 39 is provided to adjust the position of the chain. This provides simultaneous adjustment of the positions of each of the driver bits 22 and their unscrewing lugs 27 and, through the bits 22, the force dies 29 to adjust them with respect to their corresponding cavity dies 40 as mentioned above.

In operation of the device, as the cavity die assembly 40 of the die set is moved away from the force die assembly 41 (FIGURE 2), hydraulic fluid is delivered below the piston of power unit 11 to elevate its piston and piston rod to the position shown in FIGURE 1. As this occurs, chains 31 engaging sprockets 30 rotate the driver bits 22 and through the interengagement of the lugs 27 of the bits 22 with the cross slots 28 of the force dies 29, the force dies are rotated in a counterclockwise direction to unscrew them from the molded closures 42 formed by the die set. This action is accomplished generally as the die set 40 is withdrawn from its closed position to its open position or during a portion of such motion. As power unit 11 elevates its piston rod 13, power unit 12 permits its piston rod 15 to lower to the position shown in FIGURE 1 where the parts are shown at the completion of the unscrewing cycle.

Preferably, a 2:1 ratio is provided between the length of the piston strokes of the power units 11 and 12 and the length of the chain travel over the force die sprockets 30. That is, the piston strokes are one-half of the length of the chain travel required to effect the desired number of revolutions of the force dies 29 to effect unscrewing of them from the molded pieces.

After unscrewing has been effected, and while the cavity die assembly 40 is separated from the force die assembly 41, the molded pieces 42 are stripped from the machine in the normal manner. Then, as the cavity die assembly 40 is returned to its closed position, the force dies 29 are rotated in unison in a clockwise direction to bring them back to their original positions, prior to the unscrewing step. Thereupon, molding composition is injected into the cavities between the molding surfaces of the cavity die assembly 40 and the molding surfaces of the force die assembly 41, including the force dies or plugs 29.

The rotary motion of the force dies to return them to their normal positions is effected by applying fluid pressure to power unit 12 to elevate its piston rod 15. This causes the sprockets 16 carried by yoke 20 to rise and, at the same time, the piston unit 11 is permitted to fall. Chains 31, which are trained over sprockets 14 and 16 and engaged sprockets 30 on driver bits 22 and idler sprockets 32 and 33, effect a clockwise rotation of the driver bits 22 which in turn rotate the force dies 29 to their proper positions.

The power unit 11 is larger than the power unit 12, for greater turning torque is required to unscrew the force dies 29 from the molded pieces 42 than is required to return the force dies to their normal positions after the molded pieces have been removed.

It will be noted by reference to the drawing that the unscrewing fixture is in the form of a unitary mechanism which may be connected to any desired die set having force die units positioned within appropriate openings to receive the driver bits of the unscrewing fixture. A lifting ring 43 has been shown in FIGURE 1, and a suitable chain hoist may be connected to the lifting ring to remove the unscrewing fixture as a unit from the machine.

I claim:
1. An unscrewing fixture for a multiple die molding machine comprising a plurality of rotatable drivers for engagement with the die members to be unscrewed, a sprocket attached to each driver, a chain meshing with said sprockets to turn the same in unison, adjustable means for securing said chain at its ends, a pair of fluid actuated piston and cylinder power units, a pair of sprockets engageable with said chain intermediate its ends, and means connecting said sprockets to said power units for movement with the pistons therein.

2. An unscrewing fixture for a multiple die molding machine comprising a plurality of rotatable drivers for engagement with the die members to be unscrewed, a sprocket attached to each driver, a chain meshing with said sprockets to turn the same in unison, adjustable means for securing said chain at its ends, a pair of fluid actuated piston and cylinder power units, a pair of idler sprockets engageable with said chain at spaced locations intermediate its ends, means connecting said idler sprockets one to each of the pistons of said power units for reciprocatory movement therewith, and means for controlling said power units alternately to effect powered movement of said pistons to pull said chain in opposite directions over said pair of sprockets to rotate said drivers alternately in opposite directions.

3. An unscrewing fixture for a multiple die injection molding machine comprising a plurality of rotatable drivers for engagement with the die members to be unscrewed, a sprocket associated with each driver for effecting rotation of the same, a chain meshing with said sprockets to turn the same in unison, means for securing said chain at fixed points beyond the line of engagement with said driver sprockets, a pair of idler sprockets meshing with said chain intermediate each of said fixed points and said line of engagement with said driver sprockets, a pair of fluid actuated power units, and means connecting one of each of said idler sprockets to one of each of said power units for alternate lifting movement of said idler sprockets with respect to said fixed points to rotate said drivers alternately in clockwise and counterclockwise directions.

4. An unscrewing fixture for a multiple die injection molding machine comprising a plurality of rotatable drivers, a pair of spaced bearing plates in which said drivers are journaled for rotation, a sprocket secured to each driver, said driver sprockets being disposed in a chamber between said bearing plates, a bit on each driver extending beyond one of said bearing plates for engagement with a die member to be unscrewed, a pair of cylinder and piston fluid pressure actuated power units mounted above said bearing plates, yokes attached to the pistons of each of said power units, an idler sprocket carried by each yoke, a chain adjustably fixed at one end and trained over one of said idler sprockets, extending in engagement with the said driver sprockets, trained over the other of said idler sprockets, and adjustably fixed at its other end with one of said power units having its piston lowered and the other having its piston raised, and means for alternately actuating said units to power the strokes of the pistons thereof and alternately rotate said drivers in unison in clockwise and counterclockwise directions.

References Cited in the file of this patent
UNITED STATES PATENTS

| | | |
|---|---|---|
| 2,069,882 | Hall | Feb. 9, 1937 |
| 2,106,365 | Tiano | Jan. 25, 1938 |
| 2,226,326 | Scott | Dec. 24, 1940 |
| 2,391,527 | Tracy | Dec. 25, 1945 |
| 2,404,631 | Gronemeyer | July 23, 1946 |
| 2,513,216 | Sullivan et al. | June 27, 1950 |
| 2,558,027 | Wilson | June 26, 1951 |
| 2,572,297 | Able et al. | Oct. 23, 1951 |
| 2,799,050 | Traycoff | July 16, 1957 |

UNITED STATES PATENT OFFICE
CERTIFICATE OF CORRECTION

Patent No. 2,992,577                      July 18, 1961

John E. Marxen

It is hereby certified that error appears in the above numbered patent requiring correction and that the said Letters Patent should read as corrected below.

Column 1, line 9, beginning with "This invention relates" strike out all to and including "screwing fixture" in line 12, same column, and insert instead -- This invention relates to an unscrewing fixture for a molding die set. It is concerned more particularly with a power operated device for removing force dies from molded articles --.

Signed and sealed this 5th day of December 1961.

(SEAL)
Attest:

ERNEST W. SWIDER                      DAVID L. LADD
Attesting Officer                      Commissioner of Patents